March 31, 1959  A. SCHEITERLEIN ET AL  2,879,758
INTERNAL COMBUSTION ENGINE
Filed Oct. 30, 1957
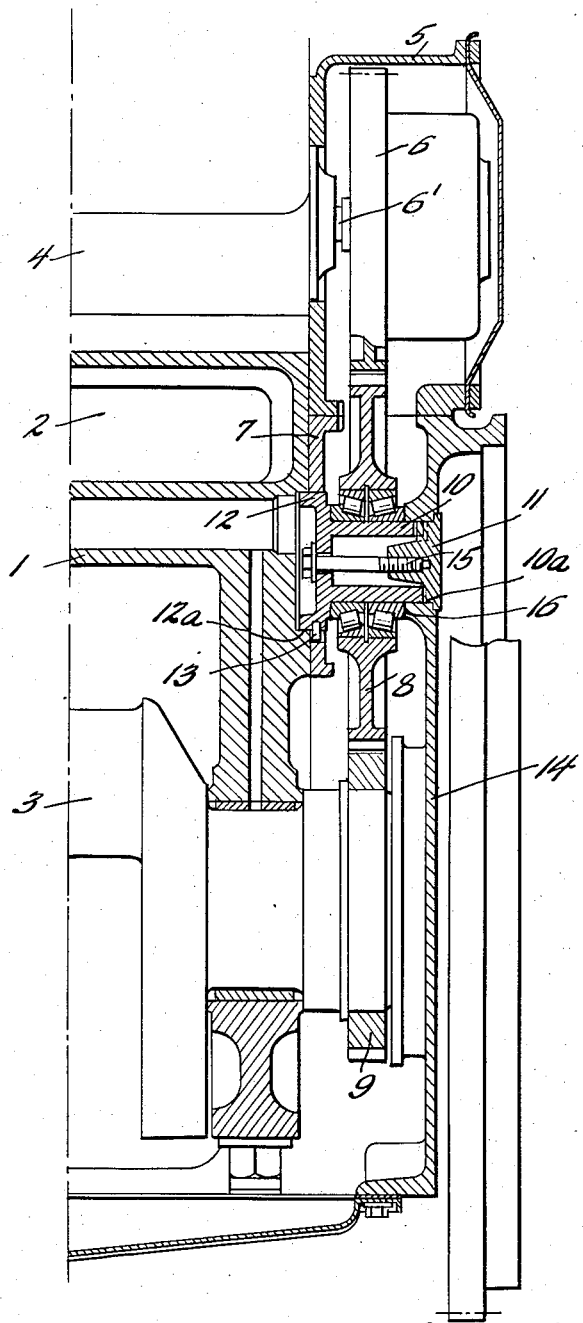
INVENTORS
Andreas Scheiterlein
Othmar Skatsche
BY
Watson, Cole, Grindle and Watson
ATTORNEYS

United States Patent Office 2,879,758
Patented Mar. 31, 1959

2,879,758

INTERNAL COMBUSTION ENGINE

Andreas Scheiterlein and Othmar Skatsche, Graz, Austria, assignors to Hans List, Graz, Austria Application October 30, 1957, Serial No. 693,345

Claims priority, application Austria October 30, 1956

2 Claims. (Cl. 123—195)

This invention relates to the design of the drive of auxiliary machines mounted on internal combustion engines and mostly necessary for the operation of the engine. Depending on whether the cylinders of the internal combustion engine are arranged in one or more rows, the distance between the crankshaft generally used as a driving means and the shaft or shafts of the auxiliary machines is considerable and must, for reasons of space, be bridged by at least one idler between the gears on the driving and those on the driven shafts. In addition to the design of bearing used for such idlers, the type of their centering during the assemblage of the engine is essential for the means required for driving the auxiliary machines.

It is the object of the invention to make possible the preassembly of the idlers in their respective housings as complete sub-assemblies or units, for subsequent application to the respective engine crank cases.

According to conventional constructions the gears of the drive of the auxiliary machines are arranged between parallel walls of the crankcase and have to be introduced separately from above or from below between the crankcase walls for assembly and fixed at the proper distance from each other by shafts or axles introduced through the walls from outside the crankcase. However, according to the invention, the gearing is located in a cover-shaped housing which also serves as the front wall of the completed engine.

This housing carries the idler or idlers each on an axle in the form of a stub shaft extending perpendicular to the said front wall defined by the housing. When this housing is assembled to the crankcase the free end of each axle engages in a locating opening or recess of the crankcase, as a result of which each idler is simultaneously centered in relation to the drive shaft mounted on the crankcase and the auxiliary machine shafts. The connection between the idler axles and the cover-shaped housing results in a simplified crankcase design since the idler axle locating holes or seats will not necessarily have to be taken into account in the engine mold. The holes can be formed by subsequent machining of the cast crankcase. In addition, the fact that the housing covers the drive of the auxiliary machines at the front wall of the crankcase offers the possibility of easily adapting the generally existent flywheel end connecting flange to prevailing conditions, thus increasing the versatility of the engine.

Where the stub shafts with the gears mounted thereon are thus preassembled into the cover-shaped housing, there will be provided a complete sub-assembly of parts for subsequent application as a unit to the front wall of the engine. As an incident to such assembly of the housing to the engine, the free ends of the axles will engage in their seats in the motor block, thereby centering the idlers and sealing the crankcase after the housing has been tightly screwed or bolted in place.

Preferably cylindrical locating holes or seats will be used in which the axles engage with a collar-shaped extension for machining purposes. The axle will be locked against rotation in the crankcase or gearbox by means of a radial detent or key.

It is preferably, though by no means essential, to divide the axle in order to facilitate its installation. This division will preferably be achieved by a design which will allow the axle and the idler bearing to be axially secured in relation to the housing. Accordingly, the axle consists of a hollow cylindrical carrier, closed at its free end which carries the collar extension co-operating with the bearing surface or locating hole of the crankcase. At the opposite end, a separable member is located which is adjustable in the axial direction of the carrier and extends behind the housing wall with a clearance. By axial adjustment of these two members of the axle the same is clamped down on the housing of the auxiliary machine drive while the ball bearings of the idler are simultaneously fixed.

The accompanying drawing illustrates an embodiment of the invention showing a partial section in the longitudinal center plane of a V-type engine.

The crankcase 1 (of which for the sake of greater clarity only the essential contours are shown) presents a chamber 2 for the scavenging air within the rows of cylinders arranged in V-configuration. Above said chamber the auxiliary machines or devices, such as blowers, pumps, etc., required for the operation of the engine are located, and these are driven through gearing from the crankshaft 3. The auxiliary device 4 is, by way of example, exemplified by a fuel injection pump. The latter is flanged to a base 5 which houses the drive gear 6 mounted on the injection pump shaft 6'. The base or housing 5 is supported at one edge on a member 7 fixed on the front wall of the crankcase with a horizontal separation joint. The remaining gears of the auxiliary machine drive are located inside the space jointly enclosed by the cover-shaped housing 14 on the one hand, and the adjoining end of the crankcase 1 on the other hand. The idler 8 provides the connection between the drive gear 9 mounted on the crankshaft and the drive gear 6 of the injection pump.

The idler gear 8 is rotatably supported and axially fixed on a stub shaft 10 which is fixedly secured to the front wall of the housing 14. It will be seen that the free end of the shaft 10 is provided with a radial enlargement or collar 12, which performs the two-fold functions of limiting the axial movement of the idler 8, and of serving as a locating pin or pilot for cooperation with a locating hole 12a in the front wall of the crankcase, to accurately position the idler 8 in proper relation with both of the gears 6 and 8.

It will be understood, of course, that the housing 14, stub shaft 10, and idler gear 8 are all preassembled as a complete unit or sub-assembly, which is then fixed on the front end of the engine crankcase 1. Thus, the cooperation between the collar 12 and locating hole 12a greatly facilitates the completed assembly by insuring accurate location of the gears in proper relationship.

Preferably the idler 8 is supported on the stub shaft 10 by means of a conventional roller bearing structure, the inner race 16 of which is axially clamped between the collar or radial enlargement 12 and the inner surface or wall of the housing 14.

In order to provide for such clamping action the shaft 10 is axially slidably supported in an opening or bore 10a in the housing 14, and may be drawn into such bore by cooperating threaded means exemplified by a nut member 11 abutting against the front of the housing 14 around the bore 10a, and a bolt 15 extending axially through the hollow shaft 10 into threaded engagement with the nut.

Preferably the collar 12 is snugly received in and closes the opening 12, and is keyed against rotation within said opening, as at 13. It will thus be seen that through my invention the assembly of the idler gears to the engines and their various auxiliary machines or devices will be greatly simplified, and the cost of production reduced accordingly.

In this application there is shown and described only the preferred embodiment of the invention. However, we recognize that the invention is capable of other and different embodiments, and that its several details may be modified in various ways, all without departing from our invention, as defined in the accompanying claims. Accordingly, the drawings and description herein are to be construed as merely illustrative in nature, and not as restrictive.

Having thus described our invention, we claim:

1. A preassembled gear housing and idler gear unit wherein the gear housing is formed with a wall having an opening therethrough, a stub shaft secured in said opening, said stub shaft being of composite construction, including an outer portion positioned in said opening and having a radial flange abutting against the housing around said opening, an inner portion projecting into the inner end of said opening for axial clamping movement relative to said outer portion, said outer portion being formed with a radial enlargement spaced inwardly from said wall, a bearing including inner and outer bearing races, said inner race being disposed on said outer end portion between the said wall and said radial enlargement, and threaded means interconnecting said inner and outer portions and operative to draw said inner portion into said hole to clamp said inner bearing race between the said wall and said radial enlargement.

2. In combination with a preassembled gear housing and idler gear unit, as defined in claim 1, an engine crankcase having a front end wall, a crankshaft having a free end rotatably projecting through said wall, a drive gear keyed on said free end, said front wall being formed with a locating hole freely axially receiving said enlargement, and an idler gear freely rotatably supported by said outer bearing race in meshing relation with said drive gear.

References Cited in the file of this patent

UNITED STATES PATENTS

| | | |
|---|---|---|
| 1,936,350 | Davis | Nov. 21, 1933 |
| 2,598,461 | Strauss | May 27, 1952 |
| 2,653,591 | Cole et al. | Sept. 29, 1953 |